(12) United States Patent
Parkinson et al.

(10) Patent No.: US 6,479,220 B1
(45) Date of Patent: Nov. 12, 2002

(54) ANTIHALATION/ACUTANCE SYSTEM FOR PHOTOTHERMOGRAPHIC MATERIALS

(75) Inventors: Michael L. Parkinson, Harlow (GB); Duncan McL A. Grieve, Saffron Walden (GB)

(73) Assignee: Eastman Kodak Company, Rochester, NY (US)

( * ) Notice: Subject to any disclaimer, the term of this patent is extended or adjusted under 35 U.S.C. 154(b) by 1272 days.

(21) Appl. No.: 08/548,213

(22) Filed: Oct. 25, 1995

(30) Foreign Application Priority Data

Nov. 22, 1994 (GB) .............................. 9423571

(51) Int. Cl.⁷ .................. G03C 1/498; G03C 1/805
(52) U.S. Cl. ................. 430/350; 430/510; 430/511; 430/576; 430/577; 430/619; 430/944; 430/945
(58) Field of Search ................. 430/502, 503, 430/510, 619, 617, 511, 350, 944, 945, 576, 577

(56) References Cited

U.S. PATENT DOCUMENTS

| | | | | |
|---|---|---|---|---|
| 4,581,325 A | * | 4/1986 | Kitchin et al. | 430/522 |
| 4,835,096 A | * | 5/1989 | Lea | 430/619 |
| 5,135,842 A | | 8/1992 | Kitchin et al. | |
| 5,380,635 A | * | 1/1995 | Gomez et al. | 430/510 |
| 5,401,620 A | * | 3/1995 | Sasai et al. | 430/363 |
| 5,441,866 A | * | 8/1995 | Miller et al. | 430/619 |

FOREIGN PATENT DOCUMENTS

| | | |
|---|---|---|
| EP | 0 179 555 A1 | 4/1986 |
| EP | 0 377 961 A1 | 7/1990 |
| EP | 0 510 960 A1 | 10/1992 |

* cited by examiner

Primary Examiner—Thorl Chea (57) ABSTRACT

A method of imaging comprising:
 providing a photothermographic material having at least one photothermographic medium and
 exposing said material to a source of narrow band radiation,
 wherein said material comprises one or more non-sensitizing acutance or antihalation dyes associated with said photothermographic medium providing an absorption maximum ($\lambda$max) within 10 nm of the wavelength of maximum output of said narrow band source and an optical density of at least 0.05 at a wavelength ($\lambda$max+50) nm.

24 Claims, 8 Drawing Sheets

ANTIHALATION/ACUTANCE SYSTEM FOR PHOTOTHERMOGRAPHIC MATERIALS

FIELD OF THE INVENTION

The invention relates to antihalation/acutance systems used in methods of imaging a photographic medium, in particular by exposure to a source of narrow band radiation.

BACKGROUND TO THE INVENTION

Poor resolution in imaging materials may result from unwanted exposure of areas immediately adjacent to intended image areas caused by the scattering of light at interfaces within the material. To overcome this problem, non-sensitizing absorbers are incorporated either within the media (an acutance dye) or in a separate layer (an antihalation layer).

In general, antihalation or acutance dyes are selected to have an absorption spectrum which matches that of the spectral response of the imaging media (see U.S. Pat. No. 4,581,325, EP-A-0 377 961 and U.S. Pat. No. 5,135,842). This is the case when a broad band source is used, for example, daylight, tungsten bulbs or xenon arcs, so that reflected or scattered light of any wavelength that would be capable of imaging the media may be absorbed.

In the case of narrow-band exposure devices, the situation is different. Devices such as lasers and light emitting diodes (LEDs) typically emit radiation over a very narrow wavelength range, for example a few nm, which is much narrower than the spectral response of typical photosensitive media, and it is inefficient, and may be counterproductive, to extend antihalation and acutance absorptions over the entire sensitivity range of the imaging media.

This is particularly relevant in the case of photothermographic materials, which do not have the benefit of a wet processing step to wash out or chemically bleach antihalation or acutance dyes once they have fulfilled their purpose. To avoid contamination of the final image, any absorber used for purposes of acutance or antihalation in photothermographic materials must either be substantially invisible to the naked eye (as is possible in the case of infrared sensitive materials), or must be bleachable under the thermal processing conditions. The "invisible" approach is described in U.S. Pat. No. 4,581,325 and EP-A-0 377 961, and the "bleachable" approach is disclosed in U.S. Pat. No. 5,135,842.

In practice, few dyes are genuinely invisible, and bleachable systems may still leave some residual stain, or require extended processing times to provide adequate bleaching, and so there is a need to minimise the quantity of dye used, consistent with acceptable image sharpness. Thus, for optimum image sharpness from exposure by narrow-band sources, such as lasers, acutance and antihalation dyes with intense, narrow absorption bands matching the output of the laser have been selected. These systems have not proved to be ideal, and resolution of the final image could be improved.

Non-sensitizing dyes are also used for the improvement of colour separation in multilayer photographic systems where the layers are sensitized to different wavelengths.

A typical colour negative film, for example, contains blue-, green-, and red-sensitive layers, with the blue-sensitive layer outermost and the red-sensitive layer nearest the base. Immediately below the blue-sensitive layer, there is usually provided a yellow filter which absorbs any blue light passing through the outermost layer, and transmits light of other wavelengths. This not only provides an antihalation effect for the outer layer, but also prevents unwanted exposure of the inner layers by blue light since photographic emulsions are inherently sensitive to blue light. Similarly, a magenta filter is positioned below the green layer to provide antihalation for that layer and to prevent unwanted exposure of the red layer.

False colour address materials typically comprise two or more photosensitive layers sensitized to different parts of the infrared (and/or visible) and are designed for exposure by two or more independently modulated sources such as lasers or LEDS. Cross-talk between layers is minimized by filters or by controlling the speed of each layer relative to the others (and adjusting the intensity of each source accordingly) or by a combination of these methods, see EP-A-0 479 167 and EP-A-0 502 508.

Dyes are selected for colour separation purposes to match as closely as possible the absorption spectrum of the dye to the spectral response of the layer immediately above it. It has been considered important to minimize absorption at longer wavelengths to avoid desensitizing lower layers.

BRIEF SUMMARY OF THE INVENTION

In a first aspect of the invention, there is provided a method of imaging a photothermographic material comprising exposing said material comprising a photothermographic medium to a source of narrow band radiation, said material comprising one or more non-sensitising acutance or antihalation dyes associated with said medium providing an absorption maximum ($\lambda$max) within 10 nm of the wavelength of maximum output of the narrow band source and an optical density of at least 0.05 at a wavelength ($\lambda$max+50) nm.

In a second aspect of the invention, there is provided a photothermographic material comprising at least one photothermographic medium associated with two or more non-sensitizing antihalation or acutance dyes for that photothermographic medium, said dyes having absorption maxima at different wavelengths such that the difference in wavelength between the maxima of longest and shortest wavelength is at least 20 nm, usually at least 30 nm, preferably at least 50 nm, the wavelength of maximum absorbance of at least one of said dyes being greater than the wavelength of maximum sensitivity of said photothermographic medium.

The term non-sensitising dyes is used to describe those dyes which do not extend the spectral sensitivity of the medium because of its presence in the element.

DESCRIPTION OF PREFERRED EMBODIMENTS

The preferred exposure source is a laser diode with an output in the range 700–900 nm, more preferably 750–850 nm. For best results, the output of the source should be at or near the sensitivity maximum of the media (e.g. within 50 nm thereof).

The dyes must be capable of providing an acutance or antihalation effect towards the photothermographic medium, and hence may be present in the same layer as the photothermographic medium, in an adjacent layer, or in a non-adjacent layer, providing only transparent, non-light-sensitive layer(s) intervene. For example, the dyes and the photothermographic medium may be coated on opposite sides of a transparent base.

Preferably, the media are of the dry silver type comprising a light-insensitive organic silver salt oxidising agent in reactive association with a light-sensitive silver halide catalyst and a reducing agent.

The wavelength of maximum sensitivity of the media may lie anywhere in the visible or near infrared region of the spectrum, but is preferably >600 nm, more preferably >700 nm, and most preferably around 800 nm.

The photothermographic media of the invention have at least two antihalation or acutance dyes which contribute significant absorbance (at least 0.05, preferably at least 0.1 OD) at wavelengths substantially in excess (e.g., by 50 nm or more) of the wavelength of intended exposure. This extra absorbance is found to provide significant improvements in image sharpness.

It is believed that part of the radiation absorbed by the sensitizing dye(s), acutance dye(s) and antihalation dye(s) in the media is re-emitted at longer wavelengths in the form of luminescence (i.e., fluorescence or phosphorescence). Dry silver materials may be particularly prone to luminescence because a considerable proportion of the sensitizing dye remains "free" (i.e., is not adsorbed on the surface of the silver halide grains), and hence is more likely to fluoresce.

Typical photothermographic (and especially IR-sensitized photothermographic) media exhibit a fairly flat spectral response (i.e., although maximum sensitivity is at W nm, there will be significant sensitivity at W+50 or even W+100 nm), and so the luminescence is capable of generating "secondary" image density, some of which will be in areas adjacent to the intended image areas, leading to loss of sharpness. By providing additional antihalation and acutance absorptions at longer wavelengths, the present invention minimizes the effect of luminescence.

The antihalation dye(s) must provide a strong absorption (e.g., an OD of 0.3 or more) at the exposing wavelength in order to absorb radiation that is scattered or reflected within the media, as is the case with conventional materials. Preferably, the dye(s) do not provide an OD of more than 1.0 at the exposing wavelength. In addition to this, in the practice of the present invention, the dye(s) must provide an optical density of at least 0.05 at wavelengths at least 50 nm greater than the exposing wavelength. When there are two or more dyes present the shortest wavelength of maximum absorbance of the dyes is preferably within 20 nm, more preferably 10 nm of the wavelength of maximum sensitivity of the photothermographic medium.

While there is no particular upper limit to the optical density at wavelengths 50 nm greater than the exposing wavelength, in practice there is little or no benefit to be gained from said optical density being greater than about 50% of the optical density at the exposing wavelength.

This absorption profile is most readily provided by choosing a first dye with absorption maximum matched to the exposing radiation, and adding appropriate amounts of one or more additional dyes with absorption maxima at longer wavelengths, e.g., by at least 20 nm. Alternatively, a single dye may be used provided it has the appropriate absorption profile. Since most of the known IR dyes have absorption spectra which are the opposite of what is required (i.e., they fall off steeply at longer wavelengths, but decline more gradually towards the visible), the use of two or more dyes is preferred. In the preferred infrared-sensitive photothermographic embodiments, the "extra" absorption may provide very little visible coloration, and hence not have to be bleachable.

Apart from improvements in image sharpness, the invention may provide improved colour separation in multilayer, multicolour photothermographic constructions, especially false-colour addressed materials. As discussed above, in multilayer systems a filter may be required to absorb light intended for the upper layer(s) to prevent it causing spurious image density in the bottom layer. However, if the dyes used for these purposes luminesce, with the re-emitted radiation being shifted to longer wavelengths, there is a greater likelihood of unwanted exposure of the bottom layer and so colour separation is degraded. By using one or more dyes providing an absorption maximum at the wavelength of exposure of the upper layer and an absorption of at least 0.05 OD at a wavelength 50 nm greater than this, in accordance with the present invention, the problem is alleviated.

There is no particular restriction on the structures of the dyes involved, provided they have the appropriate absorption profiles and are sufficiently stable under normal storage conditions of the media. Where two or more dyes are used, the dye of shortest wavelength absorption maximum preferably has a sharp absorption peak, matching the output of the exposure source, while the dye(s) of longer wavelength absorption maxima have broader, less intense absorption spectra. Any of the conventional dye classes may be used, such as cyanine, merocyanine, polymethine or squarylium. "Rigidized" derivatives (e.g., having bridging groups on the polymethine chain) are preferred where a sharp absorption peak is desired.

The dyes may be used in exactly the same way as conventional antihalation and acutance dyes, i.e., they may be dispersed within the light-sensitive media, coated as an underlayer, coated on the backside of the base or coated as a top layer, or they may be present in more than one of these locations. It is not necessary for all the dyes to be present in the same layer.

The methods and materials of the invention may be used with essentially any photothermographic medium, but are particularly suited to infrared-sensitive photothermographic materials, including both black and white materials (as described, for example, in UK Patent Appln. No. 9305324.7) and colour materials (as described, for example, in EP-A-0479167, EP-A-0502508, and U.S. Pat. No. 4,619,892).

The invention is hereinafter described in more detail by way of example only with reference to the accompanying figures in which.

Figure 1:
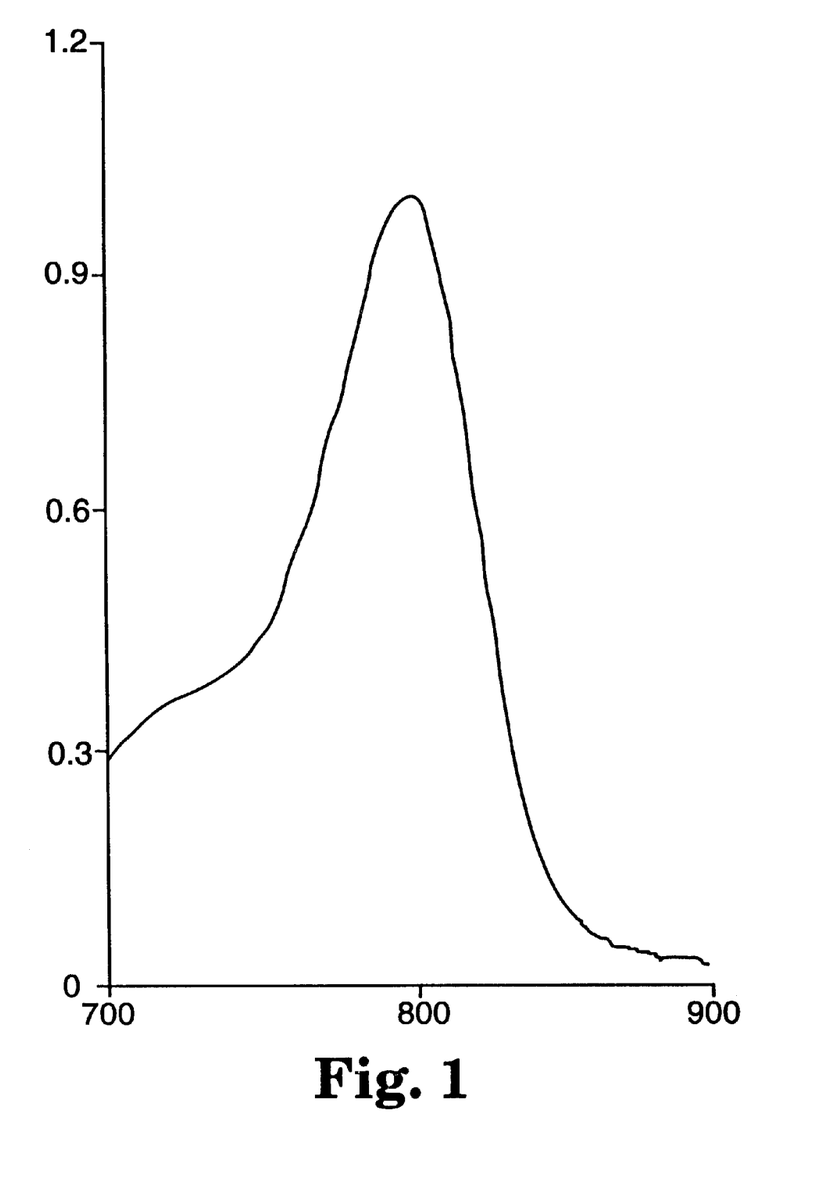
FIG. 1 shows the absorption spectrum of the reference film.

The following dyes were used for antihalation tests; with absorption maxima (in coated layers) as indicated:

All tests were carried out on photothermographic media sensitised to the 790 nm region, prepared by a method similar to that described in Example 5 of UK Patent Application No. 9305324.7, filed Mar. 16, 1993. The reference (control) material had a coating of Dye (1) on the reverse side of the transparent base for antihalation purposes (sufficient to provide a total transmission OD of 1.13 at 797 nm). FIG. 1 shows the absorption spectrum of this film referenced against air.

Test materials were prepared by coating further antihalation layers on the reverse side of the reference material, with or without prior removal of the existing backcoat, or on top of the media, or both, as described below.

Test exposures were carried out through narrow cut filters (790 and 810 nm) with rigorous exclusion of stray light of other wavelengths. Processing was carried out at 121° C. for 25 seconds.

Procedure for Image Quality Testing

A 10-step density wedge was used as the contact target (10 cm×0.4 cm), and the exposure time for each sample was adjusted to give the same effective exposure up the step wedge. The DlogE curves obtained via exposure through a standard 0–4 continuous wedge were used as references for the exposure control. The reference material was given 400 seconds exposure through the 790 nm filter and 400 seconds through the 810 nm filter, and exposure times for the other coatings were adjusted accordingly.

After processing, the antihalation layer(s) were removed and the image scanned widthwise with a scanning microdensitometer in order to examine edge-spread effects. This provided plots of optical density vs. distance in which the steepness of the curve reflected the sharpness of the image.

EXAMPLE 1 (CONTROL)

Figure 2:
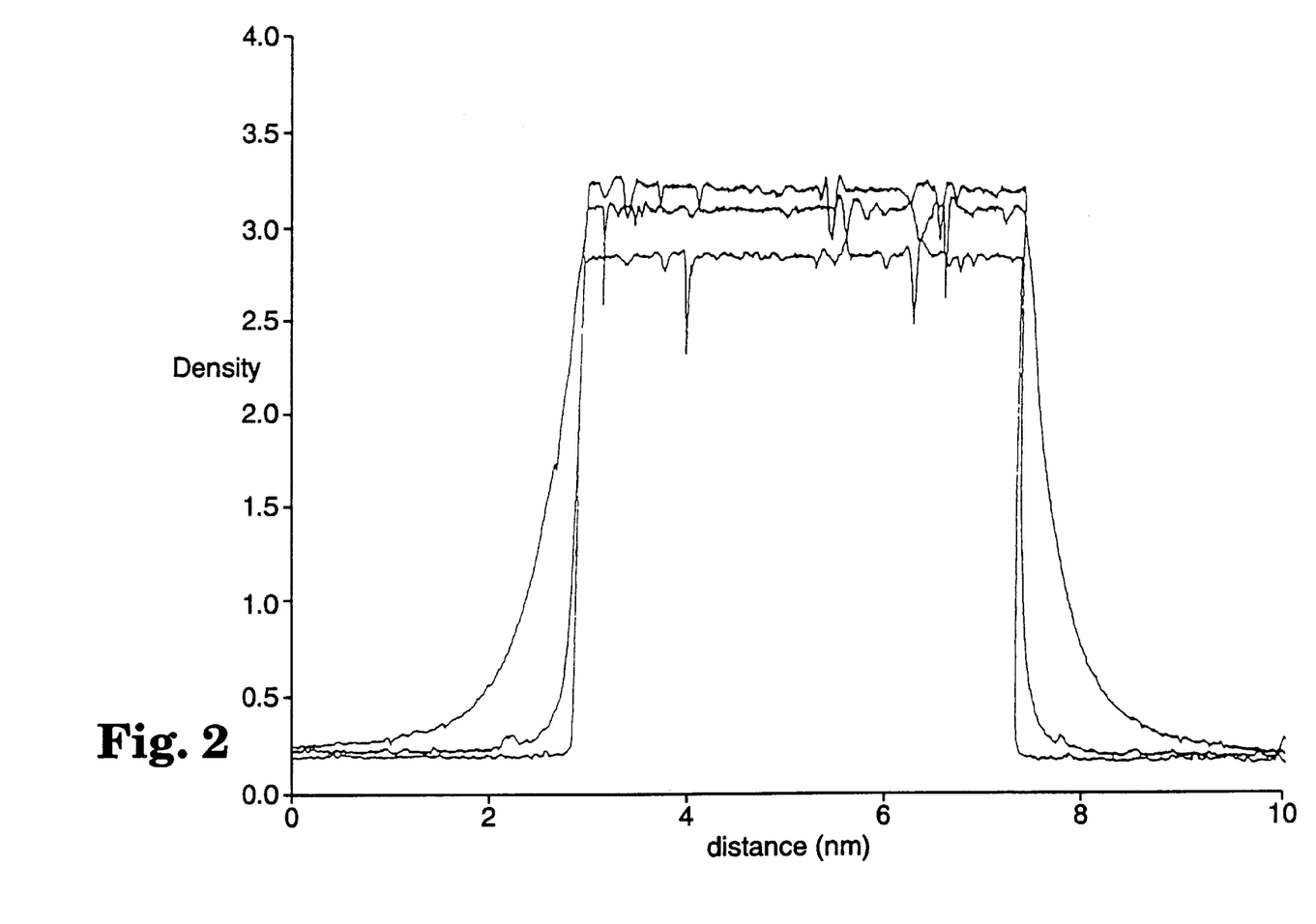
FIG. 2 shows microdensitometer plots for the reference material for various points along a 10 step wedge image (790 nm) exposure.

FIG. 2 shows microdensitometer plots for the reference material at various points along the 10-step wedge image (790 nm exposure). The image quality clearly declines at higher densities, indicating that halation is occurring, despite the presence of an antihalation dye matching the exposure wavelength.

EXAMPLE 2

Figure 3:
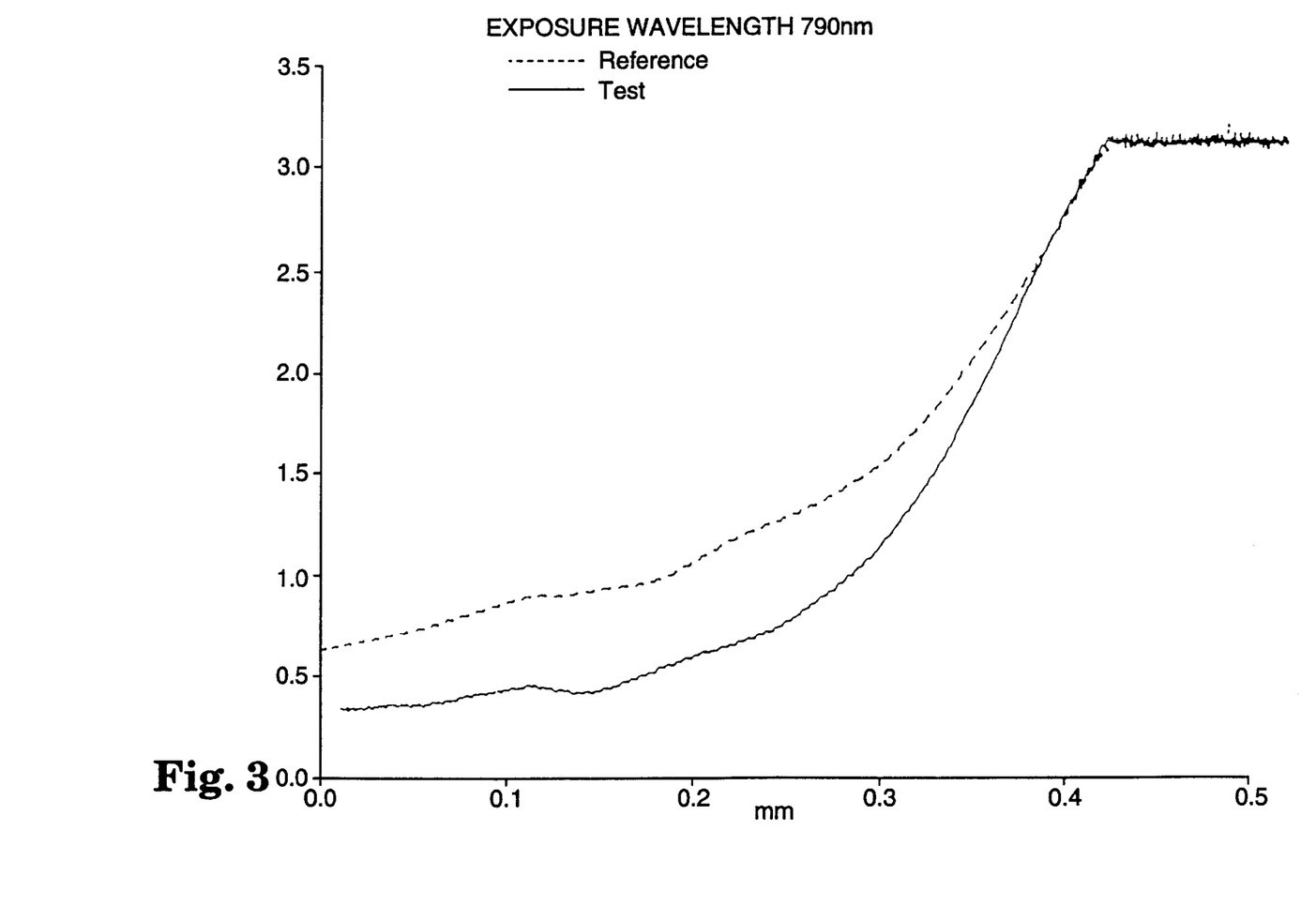
FIGS. 3–7 show microdensitometer plots for the test materials of examples 2–6 respectively and the reference material.

Cellulose acetate butyrate (CAB553.0.4, Eastman Kodak) (45 g) was dissolved in acetone (300 ml) and to 20 g of this solution was added 0.015 g Dye(2). The resulting solution was coated on the back side of the reference material at 100 microns wet thickness and allowed to dry. The image quality of the resulting test material was evaluated as described above (790 nm exposure), and FIG. 3 shows the microdensitometer traces (expanded distance scale) for the test material (curve A) and the reference material at the equivalent exposure (curve B). The presence of the additional antihalation dye clearly improves the image quality.

EXAMPLE 3

Figure 4:
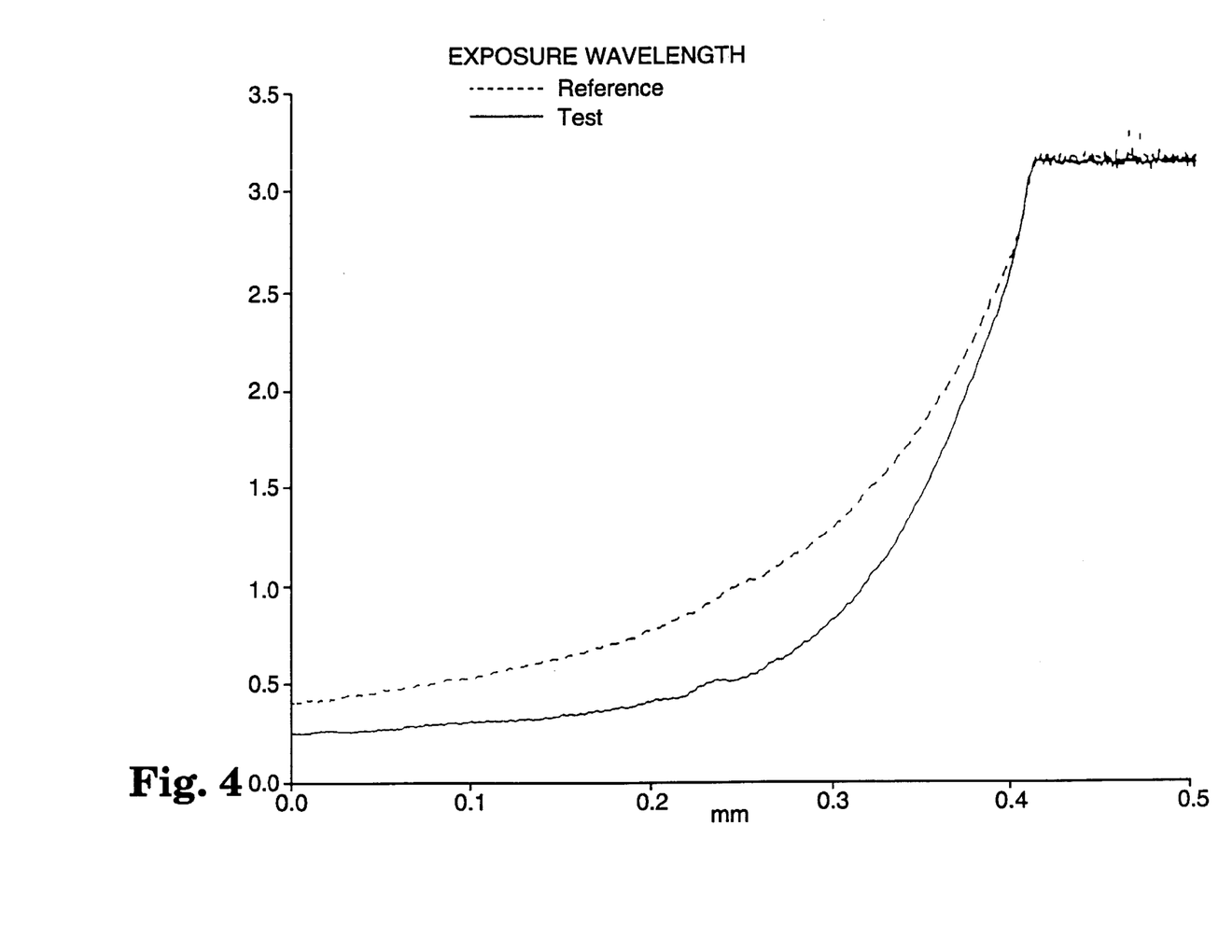

A stock solution of PVOH (polyvinylalcohol, MW 12500) was prepared by dissolving 10 g in 100 ml water. To 20 g of this solution was added Dye (1) (0.008 g) and Dye (2) (0.015 g) and the mixture coated on the back side of the reference material (100 micron wet thickness), after first removing the existing antihalation layer. (This was achieved by soaking the layer in acetone and peeling it away with the aid of adhesive tape, then further washing the polyester surface with acetone to remove any residual dye.) FIG. 4 shows the microdensitometer trace for this material (curve A) and the reference material (curve B), both exposed at 810 nm. Once again, the test material comprising an additional dye gave a sharper image.

EXAMPLE 4

Figure 5:
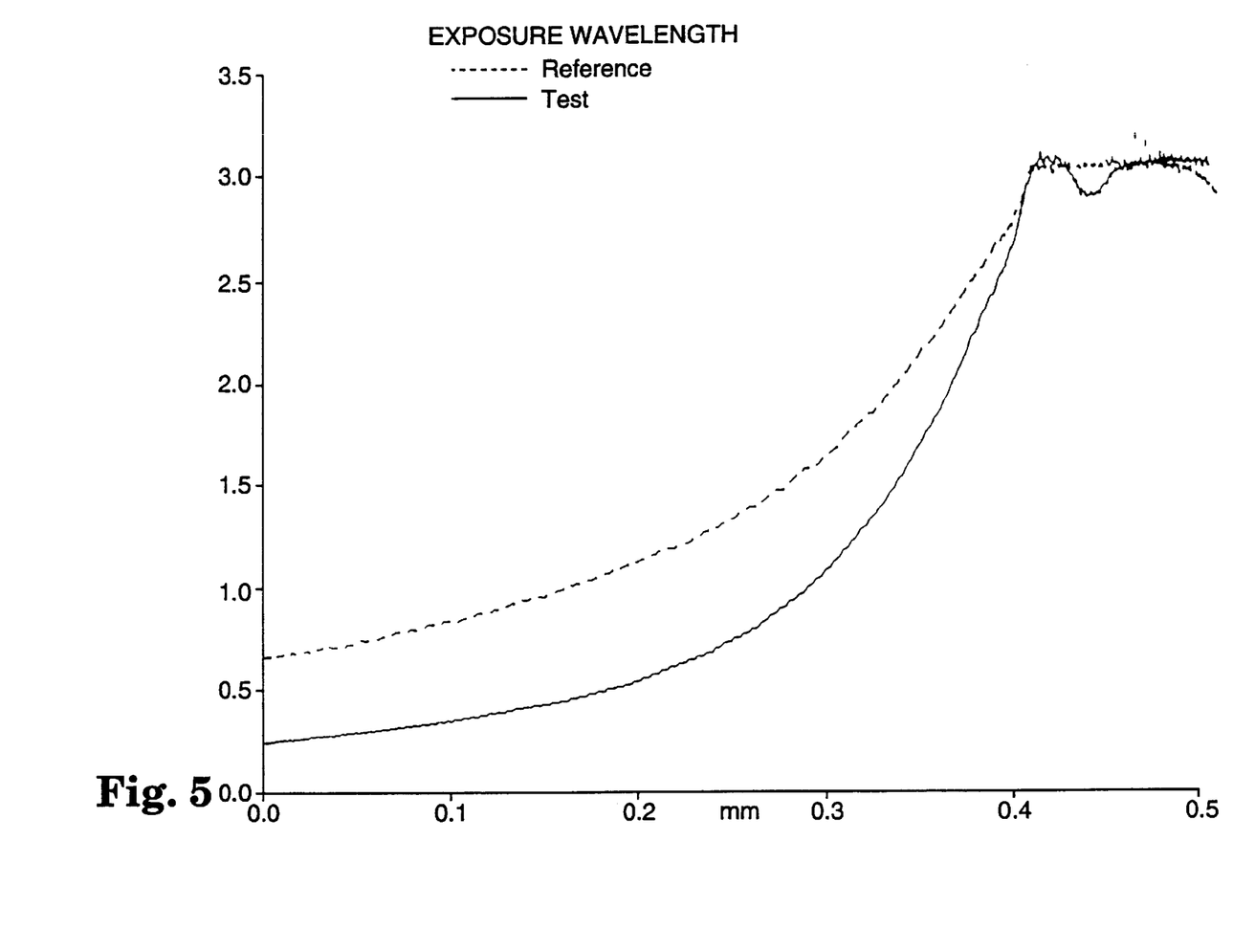

A test material was prepared as in Example 3, but reducing the quantity of Dye (1) to 0.006 g. This provided a dye density of 0.7 at 790 nm, which is significantly lower than the corresponding figure for the reference material (1.13). Nevertheless, the test material provided the sharper image on exposure at 790 nm, as shown by the microdensitometer traces in FIG. 5, once again demonstrating the beneficial effect of the additional longer wavelength dye.

EXAMPLE 5

Figure 6:
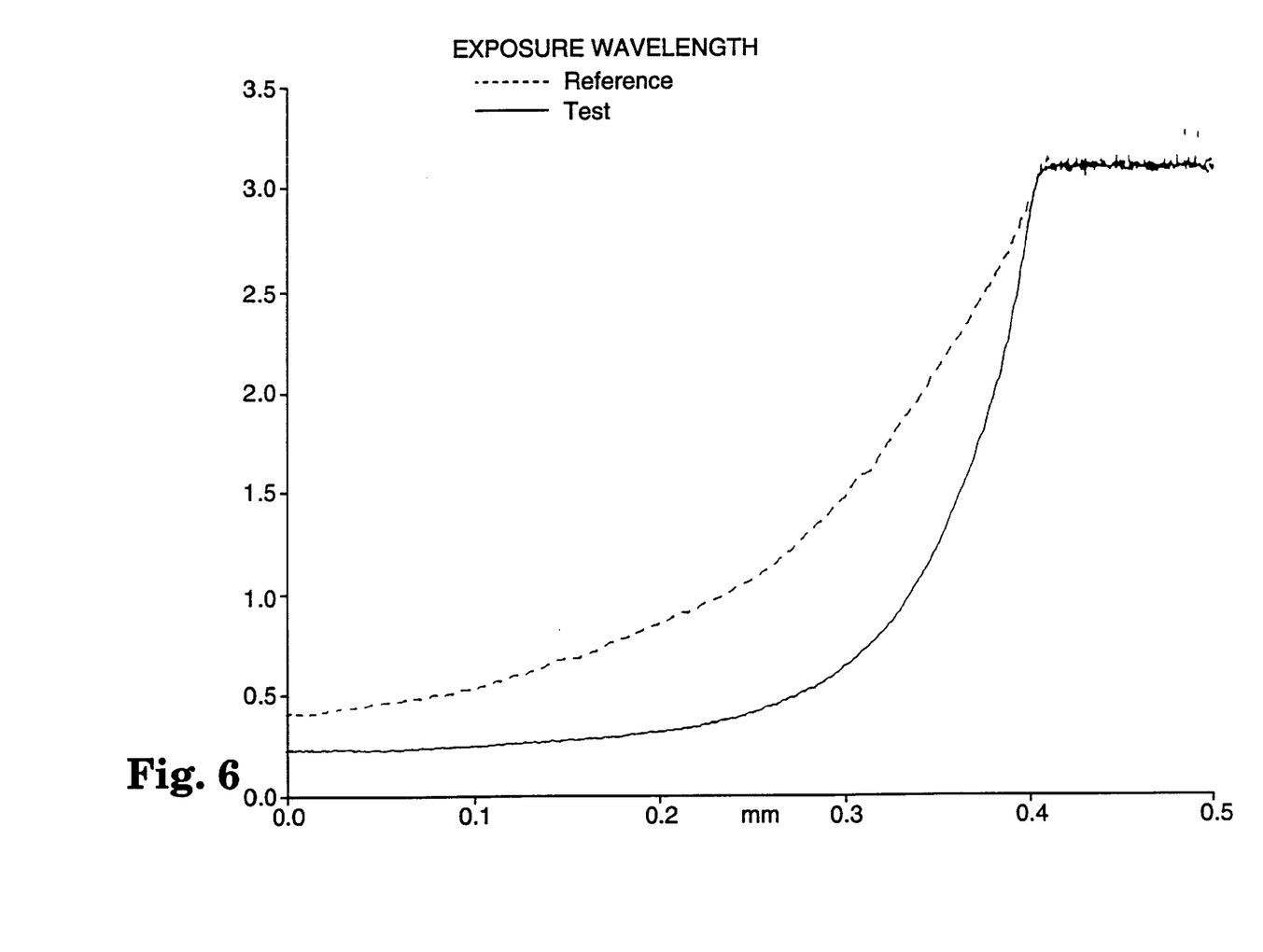

Dye (3) (0.006 g) was dissolved in 20 g PVOH stock solution and coated on top of the photosensitive layer of the reference material (50 microns wet thickness), leaving the existing antihalation backcoat in place. A similar coating of PVOH alone was made to provide a control material. FIG. 6 shows the microdensitometer traces obtained for exposure of these samples at 810 nm, and the test material clearly gave the sharper image.

EXAMPLE 6

Figure 7:
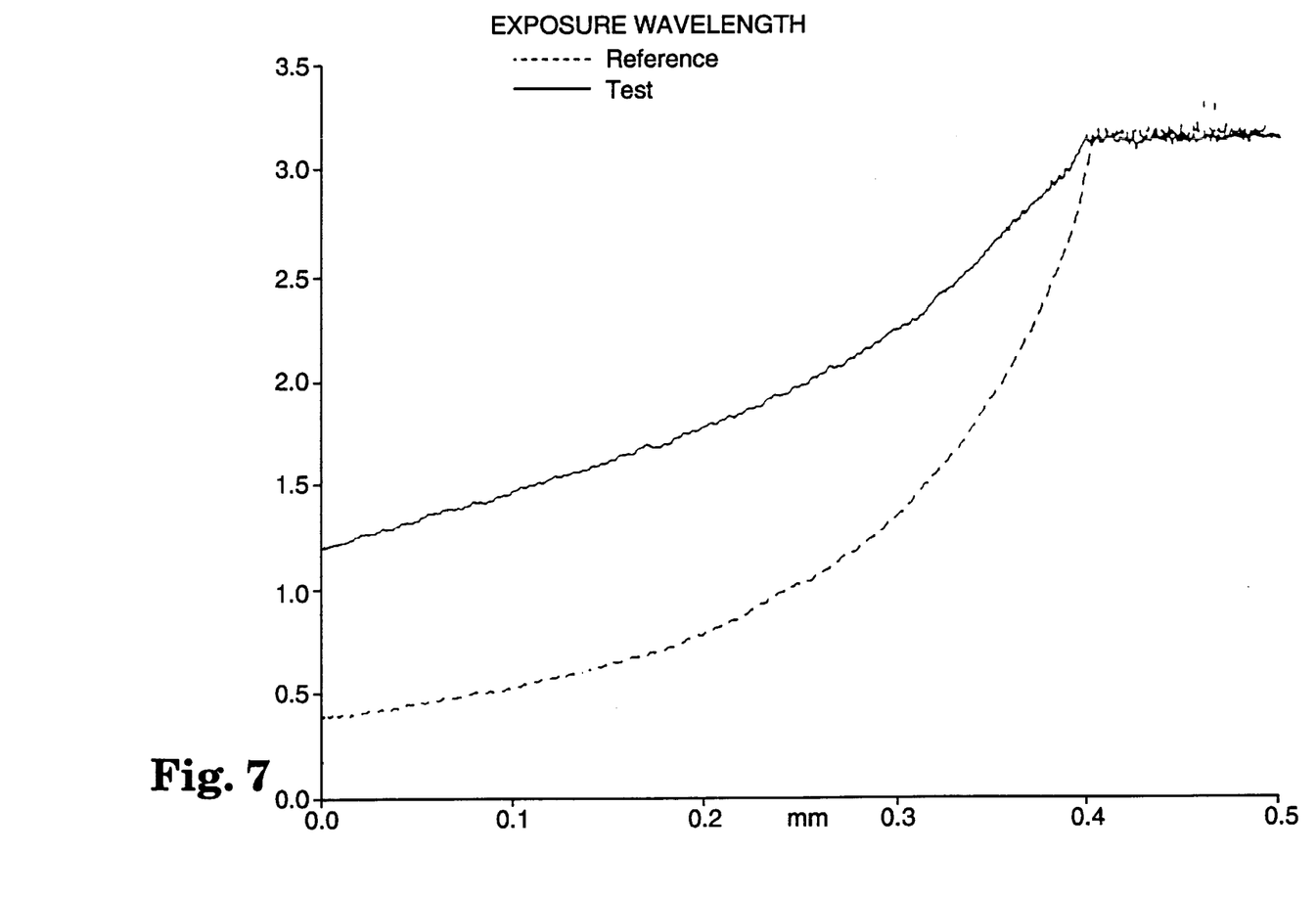
Figure 8:
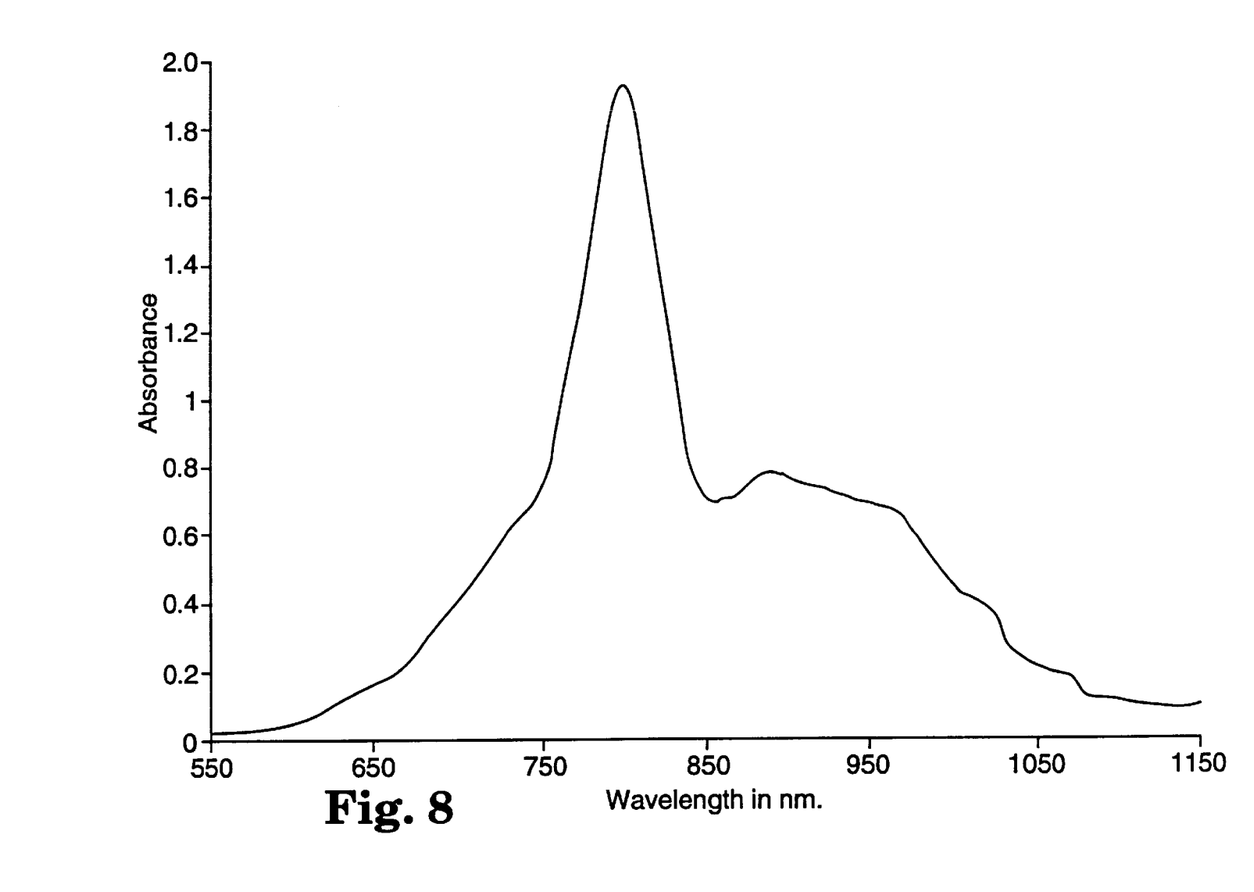
FIG. 8 shows the absorption spectrum of the dye mixture used in Example 3.

Example 5 was repeated, substituting Dye (1) (0.005 g) for Dye (3), providing a test material with Dye (1) coated on both sides, with no other antihalation dye present. When tested for image quality (810 nm exposure), it was found to be significantly worse than the reference material, as shown in FIG. 7. This is consistent with the theory that luminescence of Dye (1) causes halation.

What is claimed is:

1. A method of imaging comprising:
   providing a photothermographic material having at least one photothermographic medium and exposing said material to a source of narrow band radiation having a wavelength of maximum output,
   wherein said material comprises one or more non-sensitizing acutance or antihalation dyes associated with said photothermographic medium said one or more dyes providing an absorption maximum ($\lambda$max) within 10 nm of the wavelength of maximum output of said narrow band source and an optical density of at least 0.05 at a wavelength ($\lambda$max+50) nm.

2. A method according to claim 1 wherein said source of narrow band radiation is a laser diode with an output in the range of 700–900 nm.

3. A method according to claim 1 wherein said photothermographic medium comprises a light insensitive organic silver salt oxidising agent in reactive association with a light-sensitive silver halide catalyst and a reducing agent.

4. A method according to claim 3 wherein the maximum sensitivity of the medium is greater than 700 nm.

5. A method according to claim 1 wherein said antihalation or acutance dyes provide an optical density of 0.1 at said wavelength ($\lambda$max+50) nm.

6. A method according to claim 3 wherein said photothermographic medium is associated with two or more antihalation or acutance dyes, the wavelength of maximum absorbance of at least one of said dyes being greater than the wavelength of maximum sensitivity of said photothermographic medium.

7. A method according to claim 1 wherein said dye or dyes are members selected from the group consisting of cyanine, merocyanine, polymethine and squarylium dyes.

8. A method according to claim 7 wherein said dye(s) is a rigidised derivative.

9. A method according to claim 1 wherein said acutance or antihalation dye(s) provide an optical density of at least 0.3 but no more than 1.0 at the wavelength of maximum output.

10. A method according to claim 6 wherein the wavelength of the absorption maximum of one of said dyes is at least 20 nm longer than the wavelength of maximum absorption of the other of said dyes.

11. The method of claim 1 wherein said one or more dyes provide an optical density of at least 0.10 at a wavelength ($\lambda$max+50) nm.

12. The method of claim 1 wherein said one or more dyes provide an optical density of at least 0.10 at a wavelength ($\lambda$max+50) nm.

13. A photothermographic material comprising a photothermographic medium associated with two or more non-sensitizing antihalation or acutance dyes for that medium, said dyes having absorption maxima at different wavelengths such that the difference in wavelength between the maxima of longest and shortest wavelength is at least 20 nm, the wavelength of maximum absorbance of at least one of said dyes being greater than the wavelength of maximum sensitivity of said photothermographic medium.

14. A photothermographic material according to claim 13 wherein the wavelength of maximum absorbance of one of said dyes is at least 50 nm longer than the wavelength of maximum absorbance of the other of said dyes.

15. A photothermographic material according to claim 13 wherein the shortest wavelength of maximum absorbance of said dyes is within 20 nm of the wavelength of maximum sensitivity of said photothermographic medium.

16. A photothermographic material according to claim 13 wherein said dye having the shorter wavelength of maximum absorbance has a sharp absorption peak and said dye having longer wavelength of maximum absorbance has a broader absorption spectrum.

17. A photothermographic material according to claim 13 wherein said dyes are members selected from the group consisting of cyanine, merocyanine, polymethine and squarylium.

18. A photothermographic material according to claim 17 wherein said dye having the shorter wavelength of maximum absorbance comprises a rigidized derivative having bridging groups on the polymethine chain.

19. A photothermographic material comprising a photothermographic medium associated with two or more non-sensitizing antihalation or acutance dyes for that medium, said dyes having absorption maxima at different wavelengths such that the difference in wavelength between the maxima of longest and shortest wavelength is at least 20 nm, the wavelength of maximum absorbence of at least one of said dyes being greater than the wavelength of maximum sensitivity of said photothermographic medium, said two or more dyes providing an absorption maximum ($\lambda$max) within 10 nm of the wavelength of maximum output of said narrow band source and an optical density of at least 0.05 at a wavelength ($\lambda$max+50) nm.

20. A photothermographic material according to claim 19 wherein the shortest wavelength of maximum absorbence of said two or more dyes is within 20 nm of the wavelength of maximum sensitivity of said photothermographic medium.

21. A method of imaging comprising:

providing a photothermographic material having at least one photothermographic medium having at least one dye selected from the group consisting of spectral sensitizing dyes, acutance dyes, and antihalation dyes which absorb radiation at a first wavelength and re-emit radiation at a longer wavelength, exposing said material to a source of narrow band radiation having a wavelength of maximum output, wherein said material comprises one or more non-sensitizing acutance or antihalation dyes associated with said photothermographic medium which provide an optical density of from 0.3 to 1.0 at said wavelength of maximum output, said one or more dyes providing an absorption maximum ($\lambda$max) within 10 nm of the wavelength of maximum output of said narrow band source and an optical density of at least 0.05 at a wavelength ($\lambda$max+50) nm.

22. A method of imaging comprising:

providing a photothermographic material having at least one photothermographic medium having at least one dye selected from the group consisting of spectral sensitizing dyes, acutance dyes, and antihalation dyes which absorb radiation at a first wavelength and re-emit radiation at a longer wavelength, exposing said material to a source of narrow band radiation having a wavelength of maximum output, wherein said material comprises one or more non-sensitizing acutance or antihalation dyes associated with said photothermographic medium which provide properties of a) an optical density of from 0.3 to 1.0 at said wavelength of maximum output, and b) said one or more dyes providing an absorption maximum ($\lambda$max) within 10 nm of the wavelength of maximum output of said narrow band source and an optical density of at least 0.05 at a wavelength ($\lambda$max+50) nm.

23. The method of claim 22 wherein said one or more dyes providing an absorption maximum ($\lambda$max) within 10 nm of the wavelength of maximum output of said narrow band source and an optical density of at least 0.05 at a wavelength ($\lambda$max+50) nm comprises at least two dyes which together provide said properties.

24. The method of claim 23 wherein said one or more dyes provide an optical density of at least 0.10 at a wavelength ($\lambda$max+50) nm.

* * * * *